Patented June 17, 1930

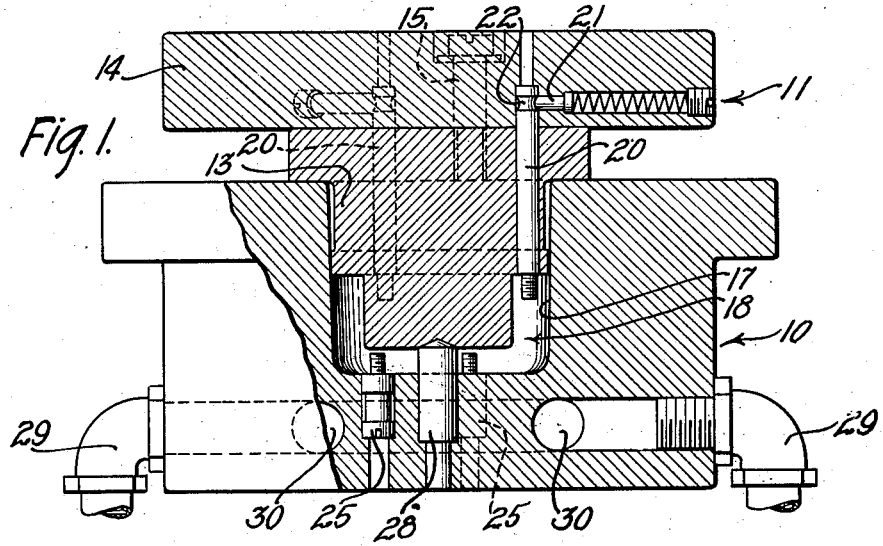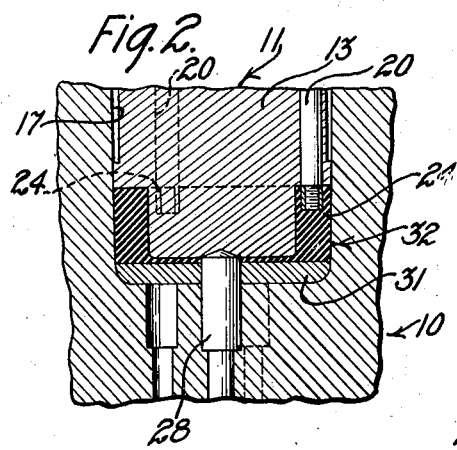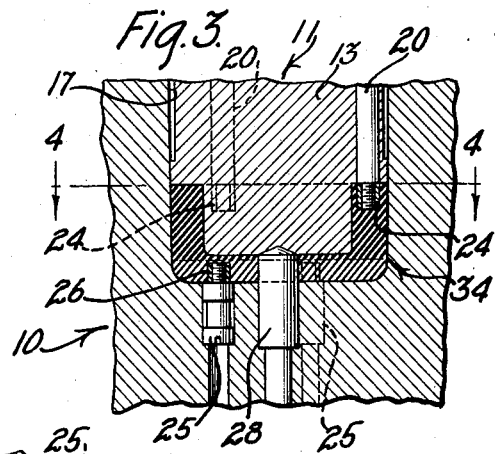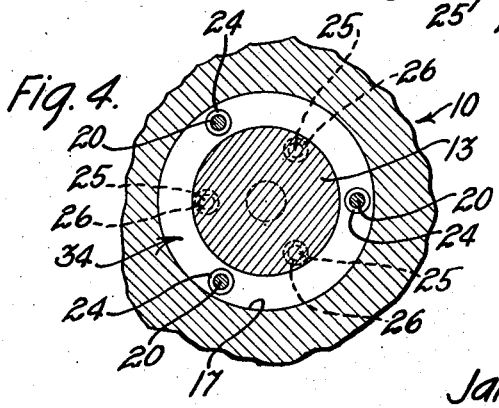
Inventor
James H. Tomlin

1,764,662

UNITED STATES PATENT OFFICE

JAMES HARVEY TOMLIN, OF CICERO, ILLINOIS, ASSIGNOR TO WESTERN ELECTRIC COMPANY, INCORPORATED, OF NEW YORK, N. Y., A CORPORATION OF NEW YORK

METHOD OF MOLDING ARTICLES

Application filed July 31, 1926. Serial No. 126,154.

This invention relates to methods of molding articles, and more particularly to methods of molding phenol condensation and like products into articles.

In the process of molding phenol condensation and like products into articles, it is the usual practice to mold the heated products under pressure into the desired form. Where the form or shape of the article is such that during the molding thereof the charge of material employed must be forced from one portion of the mold cavity to another, a certain amount of flow of the material will occur. Thus, for example, in the process of molding cup shaped articles, such as telephone transmitter cases and articles of similar design, one operation has in some instances been employed to compress the article into shape from a single initial charge of molding material. As one mold member is carried into compressing relationship with a charge of material within its companion mold member, material will be forced from that portion of the mold in which the bottom of the cup shaped article is formed into the other portion of the mold which conforms in shape to the cylindrical wall of the article. In some instances these transmitter cases are molded with screw bushings or other inserts in the bottom portion thereof and when the above mentioned method is employed in the molding of such cases the lateral pressure of the material against the inserts positioned within the mold caused by a flow of the molding material during the compression operation has a tendency to distort or shift the position of the inserts.

The primary object of this invention is to provide an improved method of effectively and efficiently molding articles.

In accordance with the general features of the invention in one embodiment thereof the cylindrical wall and an integral, thin base or bottom portion of a cup shaped article is preliminarily molded but not completely cured from a phenol condensation product, a disk or filler mold member occupying the space to be filled by the remainder of the bottom. The filler member is then removed and inserts positioned within the mold after which the bottom of the article is molded from an additional charge of material associated with the inserts, the material being compressed by means of the partially formed article. This partially formed article presents a backing which positively prevents any deleterious flow or lateral pressures of the material against the inserts. Both of the molded portions are thus completely cured into an integral homogeneous article.

These and other objects will be apparent from the following detailed description and the accompanying drawings, wherein Fig. 1 is a central, vertical, sectional view of a molding apparatus shown partly in elevation, which may be used in practicing the improved method;

Fig. 2 is a detailed fragmentary sectional view of the die sections as shown in Fig. 1 disclosing the partially formed transmitter case and filler member associated therewith;

Fig. 3 is a sectional view similar to the section disclosed in Fig. 2 showing the completely formed article with the inserts embedded therein, and Fig. 4 is a fragmentary horizontal sectional view taken on the line 4—4 of Fig. 3 disclosing the relative positions of the inserts.

Referring now to the drawings wherein like numerals have been employed to designate similar parts throughout the various figures, one type of molding apparatus which may be employed to practice this improved method includes lower and upper die sections 10 and 11, respectively. The upper die section 11 includes a plunger 13 secured at its upper end to a platen 14 by a screw 15 (Fig. 1). This platen may be secured in any suitable manner to a conventional press (not shown) for the purpose of moving the plunger 13 into and out of a cylindrical mold chamber 17 formed in the lower die section 10. The lower portion of the plunger 13 is reduced in size so that when it is carried to its lowermost position within the mold chamber a cup shaped cavity 18 is presented which conforms in size and shape to a telephone transmitter case.

Arranged concentrically of the center of the plunger 13 and vertically slidable therein are a plurality of pins 20. When these pins are properly positioned within the plunger the upper extremities thereof terminate within the platen 14 and are yieldingly secured in position by means of spring actuated plungers 21 which are designed for engagement with an annular recess 22 formed at the upper ends of the pins. The lower extremities of these pins 20 are threaded to receive cylindrical screw bushing inserts 24 and to properly position them within the upper portion of the cavity 18. Vertically slidable pins 25 are adapted to be concentrically positioned within the lower die section 10. The upper ends of these pins 25 are threaded to receive screw bushing inserts 26 which are similar to the inserts 24 and when the pins 25 are properly positioned within the die section 10 the inserts 26 associated therewith will be secured in position within the lower portion of the cavity 18. The die section 10 is provided with a core pin 28 positioned centrally thereof which extends upwardly through the bottom portion of the cavity 18.

In the process of molding phenol condensation products, the products must be heated to a required temperature in order to render the material plastic and subsequently cure it into a substantially insoluble and non-inflammable mass. Any suitable means may be employed to heat the die section 10, such as a steam line 29, as shown in Fig. 1. Steam may be introduced at one end of the steam line 29 and permitted to circulate through conduits 30 formed within the die section.

In the practice of this method of molding, the upper die section 11 is separated from its companion lower die section 10 with the pins 25 removed to permit the positioning within the bottom of the mold chamber 17 of a disk or filler member 31. This filler member 31 conforms substantially in shape to the bottom portion of the cavity, the thickness thereof being slightly less than the width of the portion of the cavity 18 between the lower end of the plunger 13 and the bottom of the cavity when the plunger occupies its lowermost position. A measured supply of suitable molding material such as phenol-condensation product is placed within the mold chamber 17 upon the upper surface of the filler member 31 and inserts 24 are threaded upon the lower ends of the pins 20 positioned within the upper die section 11. The plunger member 13 is now lowered into the mold chamber 17 and the die section is heated to the required temperature, the heat thus supplied being sufficient to mold but not to completely cure the article formed. A partially formed transmitter case or backing member 32 (Fig. 2) is molded during this operation which comprises a thin base or bottom portion and a wall portion integral therewith, and when the plunger member 13 is moved upwardly this partially formed case 32 is carried with it, together with the inserts 24 which are then securely embedded therein. The filler member 31 is removed and the inserts 26 threaded upon the pins 25 are secured in position. A second measured supply of molding material is placed within the chamber 17, resting on the bottom thereof in association with the inserts 26, and the plunger 13 again lowered. The partially formed article 32 now provides a plunger which is substantially equal in diameter to the diameter of the chamber 17 and serves as a backing to prevent the flow of material upwardly into the wall portions of the cavity 18 and is adapted to exert a uniform downward pressure against the molding material surrounding the positioned inserts 26. Because of the absence of lateral flow of the molding material during this compression operation, there is not the slightest tendency to distort or shift the position of the inserts. By the further application of heat the partially formed case 32 and the portion now containing the inserts 26 may be completely cured so as to present an integral, homogeneous mass which forms a completed transmitter case 34 (Fig. 3).

After the molding material has been completely cured the die sections 10 and 11 may be separated and by striking the upper ends of the pins 20 the completed case 34 may be readily removed from the plunger 13. The pins 20 and 25 may now be threaded from their respective inserts for use in subsequent molding operations.

This method of molding is to be distinguished from the method wherein a single operation is employed to form cup shaped articles, such as the transmitter cases 34. In such a method a sufficient initial charge of molding material is introduced into the mold chamber to completely fill the mold cavity upon the compression thereof and in such instances the force or pressure caused by the lateral flow of molding material as it is being forced from the lower portion of the mold cavity upwardly into the cylindrical wall or flange thereof is very great. Experience has shown that in some instances when cases have been molded with inserts in this manner, the pressure of the molding material against the inserts has been sufficient to tend to shear them from their respective pins.

Although the invention as herein illustrated and described is particularly well adapted for use in connection with methods of molding transmitter cases, it should be understood that the novel features thereof are capable of other applications and should be limited only by the scope of the appended claims.

What is claimed is:

1. The method of molding plastic material into articles having inserts, which consists in partially forming an article in a mold under heat and pressure, withdrawing the partially formed article, positioning an insert within the mold, associating molding material with the positioned insert, and compressing the associated material by means of the partially formed article to complete the molding of the article and to enclose the positioned insert under uniform pressure to prevent the flow of the associated material.

2. The method of molding plastic material into articles, which consists in partially forming an article within a portion of a mold under heat and pressure so as to present a plunger member, associating additional molding material with the unused portion of the mold, and employing the partially formed article as a compression plunger to complete the molding of the article.

3. The method of molding plastic material into articles including inserts, which consists in inserting a filler member into a mold, partially forming an article under heat and pressure in the unfilled portion of the mold, withdrawing the partially formed article, removing the filler member, positioning an insert within the mold, associating molding material with the positioned insert, and compressing the associated material by means of the partially formed article to complete the molding of the article and to enclose the positioned insert under uniform pressure to prevent the flow of the associated material.

4. The method of molding plastic material into articles, which consists in inserting a filler member into a mold, partially forming an article under heat and pressure within the unfilled portion of the mold so as to form a plunger member, replacing the filler member with additional molding material, and employing the partially formed article as a compression plunger to mold the associated material into an article integral therewith.

5. The method of molding plastic material into articles, which consists in molding material into a partially formed article, inserting additional material under the partially formed article, and moving the partially formed article to compress the additional molding material to complete the article.

6. The method of molding plastic material into articles which consists in partially forming an article from molding material in a mold under heat and pressure, withdrawing the partially formed article, placing additional molding material in the mold, reinserting the partially formed article in the mold and applying pressure to the partially formed article to compress the additional molding material thereby molding the molding material and the partially formed article into a completely formed integral article.

In witness whereof, I hereunto subscribe my name this 24th day of July A. D., 1926.

JAMES HARVEY TOMLIN.